US012724901B2

(12) United States Patent
Alluru et al.

(10) Patent No.: US 12,724,901 B2
(45) Date of Patent: Sep. 1, 2026

(54) REAL-TIME TAMPER-DETECTION PROTECTION FOR SOURCE CODE USING LSTM AND QLSTM WITH QUANTUM CACHE

(71) Applicant: Bank of America Corporation, Charlotte, NC (US)

(72) Inventors: Usha Alluru, Hyderabad (IN); Pushkar Taneja, Hyderabad (IN); Durga Prasad Kutthumolu, Hyderabad (IN); Yash Pant Dashputra, Hyderabad (IN); Rustum Mohiddin Mohammad, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 301 days.

(21) Appl. No.: 18/414,717

(22) Filed: Jan. 17, 2024

(65) Prior Publication Data

US 2025/0232037 A1 Jul. 17, 2025

(51) Int. Cl.
*G06F 21/57* (2013.01)

(52) U.S. Cl.
CPC .................................. *G06F 21/577* (2013.01)

(58) Field of Classification Search
CPC ..................................................... G06F 21/577
See application file for complete search history.

(56) References Cited

U.S. PATENT DOCUMENTS

| | | | |
|---|---|---|---|
| 11,068,593 | B2 | 7/2021 | Shabtai et al. |
| 11,081,219 | B1 | 8/2021 | Dods et al. |
| 11,238,240 | B2 | 2/2022 | Hunter |
| 11,507,662 | B2 | 11/2022 | Addepalli |
| 11,764,959 | B1 | 9/2023 | Dods et al. |
| 11,801,535 | B2 | 10/2023 | Parr et al. |

(Continued)

FOREIGN PATENT DOCUMENTS

| | | | |
|---|---|---|---|
| CN | 110543419 | B | 9/2021 |
| EP | 3511862 | A1 | 7/2019 |

(Continued)

*Primary Examiner* — Catherine Thiaw
*Assistant Examiner* — Daniel Elahian
(74) *Attorney, Agent, or Firm* — Banner & Witcoff, Ltd.

(57) ABSTRACT

Systems and methods for detecting tampering in software are disclosed. The system includes a preprocessor that converts source code into a minimal intermediate representation and extracts semantic and syntactic features using word embedding algorithms. The preprocessed data is then fed into two machine learning models: a classical LSTM model and a quantum LSTM model. The classical LSTM model detects basic tampering patterns, while the QLSTM model leverages quantum principles to enhance analysis and prediction of more complex tampering attempts. The system also includes a quantum cache for efficient data retrieval and manipulation, enabling real-time or near-real-time analysis. The combination of these features provides improved accuracy and effectiveness in detecting tampering, enabling timely intervention and mitigation of security threats. Remediation may be performed automatically or manually and can be based on historically determined or dynamically generated solutions.

20 Claims, 3 Drawing Sheets

(56) References Cited

U.S. PATENT DOCUMENTS

2009/0222429 A1* 9/2009 Aizenbud-Reshef ..... G06F 8/36 707/999.005
2016/0188885 A1* 6/2016 Lee ...................... G06F 21/577 726/25
2020/0027026 A1 1/2020 Cook et al.
2020/0162236 A1 5/2020 Miller et al.
2020/0162266 A1 5/2020 Miller et al.
2021/0007023 A1 1/2021 Umapathy et al.
2021/0209388 A1 7/2021 Ciftci et al.
2022/0038359 A1 2/2022 Svennebring et al.
2022/0101012 A1 3/2022 Lee et al.
2022/0108010 A1* 4/2022 Bishop, III ............. G06F 8/436
2022/0124560 A1 4/2022 Yeh et al.
2022/0147876 A1 5/2022 Dalli et al.
2022/0253533 A1* 8/2022 Choi ..................... G06F 21/577
2024/0176889 A1* 5/2024 Alam .................... G06F 21/577
2025/0209176 A1* 6/2025 Palanki ................. G06F 21/577
2025/0265349 A1* 8/2025 Taneja .................. G06F 21/577

FOREIGN PATENT DOCUMENTS

WO 2022101515 A1 5/2022
WO 2023030513 A1 3/2023

* cited by examiner

REAL-TIME TAMPER-DETECTION PROTECTION FOR SOURCE CODE USING LSTM AND QLSTM WITH QUANTUM CACHE

TECHNICAL FIELD

The present disclosure relates to information security and, more particularly, to prevention unauthorized data modification including systems, methods, and apparatus for real-time tamper-detection protection of source code (including data) to prohibit falsification, alteration, or modification of the same.

DESCRIPTION OF THE RELATED ART

Tampering of source code and sensitive data is a serious problem. Tampering is the unauthorized alteration of code or sensitive data. This can be done through various means, such as: Direct modification of code: This involves manually changing the code of an application or system. Memory injection: This involves injecting malicious code into the memory of a running application or system. API hooking: This involves intercepting and modifying the calls made to an application's APIs. Data manipulation: This involves directly modifying data stored in a database or other storage system.

Tampering can introduce several security vulnerabilities that can have significant consequences. Tampered code can be used to steal user credentials, such as usernames and passwords. This information can then be used to gain unauthorized access to accounts and systems. Data manipulation: Tampered code can be used to manipulate data, such as sensitive. This can have serious consequences for individuals and organizations. Security breaches: Tampering can be used to create security breaches, allowing attackers to gain access to confidential information or systems. System failures: Tampered code can cause system failures, leading to downtime and lost productivity. Financial fraud: Tampered code can be used to commit financial fraud, such as stealing money or making unauthorized purchases. Reputational damage: Tampering can damage the reputation of an organization, leading to loss of trust and business. Regulatory implications: Tampering can violate regulations, leading to fines.

Traditional tampering detection methods rely on signatures to identify malicious code or data. However, these methods have several limitations: Inability to detect new/evolving forms of tampering: Signatures are only effective against known threats. They are unable to detect new or evolving forms of tampering that do not match existing signatures. Reliance on static data: Traditional methods rely on static data, such as the original code or data, to identify changes. This makes them vulnerable to attacks that modify the code or data in a way that does not alter its signature. Inability to detect real-time tampering: Traditional methods are often unable to detect tampering in real-time. This means that attackers can have time to compromise the vulnerability before it is detected.

Hence, there is a critical and long-felt need for dynamic tampering detection systems that can address the limitations of traditional methods. These systems should have the following capabilities: Ability to detect new/evolving forms of tampering: These systems should be able to detect new and evolving forms of tampering, even if they do not match existing signatures. Real-time detection: These systems should be able to detect tampering in real-time, allowing organizations to take immediate action to mitigate the risks. Shifting security to the left: These systems should be able to help developers detect and fix vulnerabilities earlier in the development process, making it more difficult for attackers to compromise them.

By deploying dynamic tampering detection systems, organizations can enjoy a number of benefits, including: Reduced risk of security breaches: By detecting tampering early, organizations can take steps to mitigate the risks of security breaches. Improved data integrity: Dynamic tampering detection can help to ensure the integrity of data, which is critical for many organizations. Enhanced system stability: By preventing system failures caused by tampering, organizations can improve system stability and reliability. Reduced costs: Early detection of tampering can help organizations to avoid the costs associated with security breaches, data loss, and system outages.

In sum, tampering of code and sensitive data is a serious threat that can have significant consequences for organizations. Traditional tampering detection methods are no longer sufficient to address this threat. There is a critical need for dynamic tampering detection systems that can provide real-time protection against new and evolving forms of tampering. By deploying these systems, organizations can significantly reduce the risks associated with tampering and improve their overall security posture.

SUMMARY OF THE INVENTION

In accordance with one or more arrangements of the non-limiting sample disclosures contained herein, solutions are provided to address one or more issues pertaining to detecting software code tampering. This is accomplished by using two key components: (a) deep neural network model (LSTM) (this model learns features extracted from source code and is effective at detecting basic tampering patterns), and (b) quantum machine learning (ML) model (QLSTM (this model leverages quantum principles and operations to enhance the analysis and prediction of tampering, potentially leading to improved accuracy and effectiveness).

Sample key features include the following. Minimal Intermediate Representation: The source code is converted into a minimal representation to remove irrelevant information and improve efficiency. Semantic and Syntactic Features: State-of-the-art word embedding algorithms like GloVe and fastText are used to capture semantic and syntactic features, enhancing the models' ability to understand the code's meaning. Quantum Cache: This technology facilitates faster retrieval and manipulation of quantum data, enabling real-time or near-real-time analysis. Real-Time Detection: The framework emphasizes real-time or near-real-time detection of code vulnerabilities, allowing for quick mitigation actions. Multilingual Support: The framework can handle code written in multiple languages, making it applicable to a wider range of software systems. Tampering Prediction: The QLSTM model can predict potential tampering based on its analysis, providing valuable insights for proactive security measures. Combination of LSTM and QLSTM: A hybrid approach leverages the strengths of both classical and quantum machine learning techniques. Efficiency through Quantum Cache: Utilizing quantum cache significantly improves the speed and efficiency of the QLSTM model. Real-Time Focus: The framework's emphasis on real-time detection addresses a critical limitation of existing methods. Multilingual Support: This feature expands the applicability of the solution to a broader range of software development environments. Tampering Prediction: The ability to predict potential tampering is a novel application of QLSTM and offers significant security benefits.

Sample benefits of the inventions contained herein include Improved Accuracy and Effectiveness: The combination of LSTM and QLSTM offers the potential for improved accuracy and effectiveness in detecting tampering compared to existing methods. Real-Time Detection: Enables timely intervention and mitigation of security threats. Wider Applicability: The framework can be applied to a broader range of software systems due to its multilingual support. Proactive Security: Tampering prediction allows for proactive measures to be taken before attacks occur.

Overall, the solution presented herein overcome the challenges of software code tampering by leveraging the power of deep learning and quantum machine learning. The combined use of LSTM and QLSTM, along with the unique features like quantum cache and multilingual support, significantly improves the accuracy and effectiveness of tampering detection, offering a valuable tool for developers and security professionals.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a method for real-time tamper detection in software code and remediation of software code vulnerabilities, can comprise one or more steps such as:

a. retrieving, by a data processing layer, sample datasets of vulnerable code examples and non-vulnerable code examples;
b. tokenizing, by the data processing layer, the sample datasets into tokenized code examples suitable for long-term short-term memory (LSTM) modeling and quantum long short-term memory (QLSTM) modeling;
c. splitting, by the data processing layer, the tokenized code examples into a training dataset, a validation dataset, and a test dataset;
d. transmitting, by the data processing layer to a model training layer, the training dataset, the validation dataset, and the test dataset, said model training layer including an LSTM model and a QLSTM model;
e. LSTM training, by the model training layer, the LSTM model by:
   i. inputting the training datasets;
   ii. executing, by the LSTM model, the training dataset;
   iii. calculating actual outputs at each time step during execution;
   iv. determining a loss function based on predicted outputs and desired outputs;
   v. calculating gradients for the loss function;
   vi. propagating the gradients back into the LSTM model by back propagation through time (BPTT) or truncated back propagation through time (TBPTT);
   vii. repeating the LSTM training until the LSTM model converges to a desired level of performance;
f. validating, by the model training layer, the LSTM model based on the validation dataset to monitor performance of the LSTM model and prevent overfitting;
g. testing, by the model training layer, the LSTM model based on the test dataset to access effectiveness in identifying tampered code;
h. QLSTM training, by the model training layer, the QLSTM model by:
   i. mapping the tokenized code samples onto a quantum state using quantum encoding into quantum-encoded code data;
   ii. implementing, based on the LSTM model, a quantum circuit to analyze the quantum-encoded code data to identify patterns or features related to said software code vulnerabilities;
   iii. evaluating the QLSTM model using the validation dataset and the test dataset;
i. receiving, by the data processing layer, source code to test for said software code vulnerabilities;
j. pre-processing, by the data processing layer, the source code to remove irrelevant characters, remove comments, remove whitespaces, and normalize code structure;
k. tokenizing, by the data processing layer, the source code to convert code snippets into a sequence of tokens;
l. encoding, by the data processing layer, the sequence of tokens into numerical sequences that can be analyzed by the LSTM model and the QLSTM model;
m. executing, by a code vulnerability detection layer, the LSTM model on the numerical sequences if the source code is below a complexity threshold or the source code contains structured code;
n. executing, by the code vulnerability detection layer, the QLSTM model on the numerical sequences if the source code is above the complexity threshold or the source code contains unstructured code;
o. storing, by the code vulnerability detection layer, LSTM results from the LSTM model in a memory cache;
p. storing, by the code vulnerability detection layer, QLSTM results from the QLSTM model in a quantum cache;
q. predicting, by the code vulnerability detection layer using the memory cache or the quantum cache, tampered code in the source code;
r. detecting, by the code vulnerability detection layer using the memory cache or the quantum cache, potential vulnerabilities in the source code; and
s. remediating, automatically by a remediation module, the tampered code or the potential vulnerabilities in the source code.

In some arrangements, the method may include the step of dynamically switching between the LSTM model and the QLSTM model based on real-time analysis code complexity, code volume, and whether the source code contains said structured code or said unstructured code. Also, the method may include the step of dynamically switching between the LSTM model and the QLSTM model based on a frequency of tamper detection analysis requests.

In some arrangements, the method may include the step of generating, by the code vulnerability detection layer, a report that identifies each area of the source code that contains tampered code or the potential vulnerabilities.

In some arrangements, the loss function is mean squared error (MSE), cross-entropy, or negative log-likelihood.

In some arrangements, the mapping of the tokenized code samples uses quantum embedding techniques to represent the tokenized code samples in the quantum state, said quantum embedding techniques including: amplitude encoding, phase encoding, quantum feature maps, or quantum convolutional neural networks.

In some arrangements, a method for real-time tamper detection in software code and remediation of software code vulnerabilities, can comprise one or more steps such as:

a. retrieving, by a data processing layer, sample datasets of vulnerable code examples and non-vulnerable code examples;
b. tokenizing, by the data processing layer, the sample datasets into tokenized code examples suitable for long-term short-term memory (LSTM) modeling and quantum long short-term memory (QLSTM) modeling;
c. splitting, by the data processing layer, the tokenized code examples into a training dataset, a validation dataset, and a test dataset;
d. transmitting, by the data processing layer to a model training layer, the training dataset, the validation dataset, and the test dataset, said model training layer including an LSTM model and a QLSTM model;
e. LSTM training, by the model training layer, the LSTM model by:
   i. inputting the training datasets;
   ii. executing, by the LSTM model, the training dataset;
   iii. calculating actual outputs at each time step during execution;
   iv. determining, based on predicted outputs and desired outputs, a loss function of mean squared error (MSE), cross-entropy, or negative log-likelihood;
   v. calculating gradients for the loss function;
   vi. propagating the gradients back into the LSTM model by back propagation through time (BPTT);
   vii. repeating the LSTM training until the LSTM model converges to a desired level of performance;
f. validating, by the model training layer, the LSTM model based on the validation dataset to monitor performance of the LSTM model and prevent overfitting;
g. testing, by the model training layer, the LSTM model based on the test dataset to access effectiveness in identifying tampered code;
h. QLSTM training, by the model training layer, the QLSTM model by:
   i. mapping the tokenized code samples onto a quantum state using quantum encoding into quantum-encoded code data based on quantum feature mapping;
   ii. implementing, based on the LSTM model, a quantum circuit to analyze the quantum-encoded code data to identify patterns or features related to said software code vulnerabilities;
   iii. evaluating the QLSTM model using the validation dataset and the test dataset;
i. receiving, by the data processing layer, source code to test for said software code vulnerabilities;
j. pre-processing, by the data processing layer, the source code to remove irrelevant characters, remove comments, remove whitespaces, and normalize code structure;
k. tokenizing, by the data processing layer, the source code to convert code snippets into a sequence of tokens;
l. encoding, by the data processing layer, the sequence of tokens into numerical sequences that can be analyzed by the LSTM model and the QLSTM model;
m. executing, by a code vulnerability detection layer, the LSTM model on the numerical sequences if the source code is below a complexity threshold or the source code contains structured code;
n. executing, by the code vulnerability detection layer, the QLSTM model on the numerical sequences if the source code is above the complexity threshold or the source code contains unstructured code;
o. dynamically switching between the LSTM model and the QLSTM model based on real-time analysis code complexity, code volume, whether the source code contains said structured code or said unstructured code, and a frequency of tamper detection analysis requests;
p. storing, by the code vulnerability detection layer, LSTM results from the LSTM model in a memory cache;
q. storing, by the code vulnerability detection layer, QLSTM results from the QLSTM model in a quantum cache;
r. predicting, by the code vulnerability detection layer using the memory cache or the quantum cache, tampered code in the source code;
s. detecting, by the code vulnerability detection layer using the memory cache or the quantum cache, potential vulnerabilities in the source code; and
t. remediating the tampered code or the potential vulnerabilities in the source code.

In some arrangements, remediation of tampered code or potential vulnerabilities may be performed by a trained model automatically. The remediation can be performed by machine learning that is supervised, semi-supervised, or unsupervised, or otherwise with artificial intelligence.

In some arrangements, a system for real-time tamper detection in software code and remediation of vulnerabilities can include:

a. a data processing layer configured to process and tokenize source code into tokenized code, said source code having a complexity and volume as well as containing structured code or unstructured code, said data processing layer including:
   i. a data collection module to provide a dataset of vulnerable code examples and non-vulnerable examples,
   ii. a data preprocessing module to tokenize the vulnerable code examples and the non-vulnerable examples, and
   iii. a data split module to split the dataset into training data, validation data, and test set data;
b. a model training layer configured receive the tokenized code from the data processing layer and to train:
   i. a long short-term memory (LSTM) model for analyzing said source code if the complexity is below a complexity threshold, the volume is below a volume threshold, and the source code contains said structured code;
   ii. a quantum long short-term memory (QLSTM) model for analyzing said source code if the complexity is above a complexity threshold, the volume is above a volume threshold, or the source code contains said unstructured code;
c. a code vulnerability detection layer configured to use:
   i. the trained LSTM model to analyze the tokenized code for potential vulnerabilities; and ii. the trained QLSTM model to analyze the tokenized code for potential vulnerabilities;

d. a quantum cache configured to store and retrieve quantum states from the QLSTM; and e. a trained model configured to resolve detected threats.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
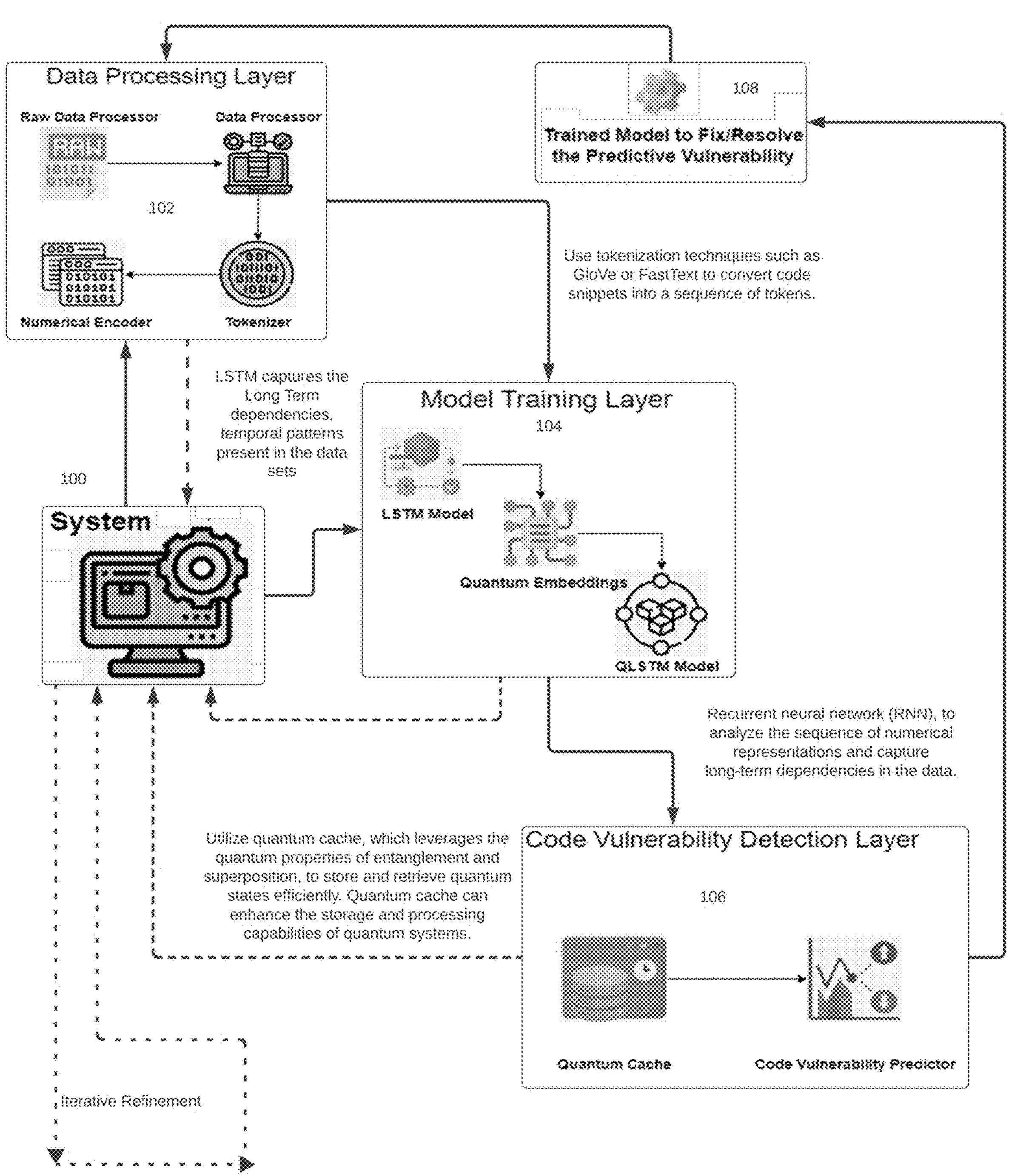
FIG. 1 depicts a functional architecture and flow diagram showing sample interactions, interfaces, steps, functions, and components of a system and process for providing real-time tamper-detection protection for source code using LSTM and QLSTM with quantum cache in accordance with one or more aspects of this disclosure as it pertains to a data processing layer, trained model, model training layer, controlling system, and code vulnerability-detection layer.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), quantum circuits, quantum computing, servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts a functional architecture and flow diagram showing sample interactions, interfaces, steps, functions, and components of a system and process for providing real-time tamper-detection protection for source code using LSTM and QLSTM with quantum cache in accordance with one or more aspects of this disclosure as it pertains to a controlling system 100, data processing layer 102, model training layer 104, code vulnerability-detection layer, 106, and a trained model to fix/resolve the predictive vulnerability 108.

Controlling system 100 interacts with the data processing layer 102, which includes a raw data processor providing input to a data processor which feeds into a tokenizer and then is provided to a numerical encoder. The output of the data processing layer is provided to a model training layer 104. Tokenization techniques such as GloVe or FastText can be used to convert code snippets into a sequence of tokens. Controlling system 100 also provides input to the model training layer and control of the same.

The model training layer 104 includes both LSTM and QLSTM models. LSTM (Long Short-Term Memory) and QLSTM (Quantum Long Short-Term Memory) are both recurrent neural network (RNN) models designed for processing sequential data. However, they have distinct characteristics and capabilities.

LSTM: Classical RNN architecture: It utilizes a cell structure with gates (forget, input, and output) that control the flow of information within the network. Handles long-term dependencies: LSTM can capture long-term dependencies in sequences better than traditional RNNs. LSTM also handles temporal patterns present in the data sets. LSTMs operate on classical computers, which have limitations in processing large amounts of data or solving complex problems.

QLSTM: Hybrid model: QLSTM combines the classical LSTM architecture with quantum principles and operations, such as superposition and entanglement. Enhanced feature representation: By leveraging quantum properties, QLSTM can potentially represent complex features and relationships in data more effectively than its classical counterpart. Improved accuracy and efficiency: QLSTMs have the potential to achieve higher accuracy in tasks like pattern detection and anomaly identification while requiring less computational power compared to classical LSTMs.

The model training layer 104 also includes quantum embedding. Quantum embedding refers to the process of encoding classical data into a quantum state. This involves transforming classical information, such as numbers, text, or images, into a representation that can be manipulated and processed using quantum algorithms and hardware.

Various methods for quantum embedding include: 1. Amplitude encoding: This method represents each element of the classical data using the amplitude of a qubit. For example, a binary number "01" could be encoded as a qubit with an amplitude of 1 for the first level and an amplitude of 0 for the second level. 2. Phase encoding: This method represents classical data using the phase of a qubit. A binary number "01" could be encoded as a qubit with a phase of 0 for the first level and a phase of $\pi$ for the second level. 3. Quantum feature maps: This approach uses a series of quantum gates to encode classical data into a complex quantum state. This method can be more efficient than other methods for representing high-dimensional data. 4. Quantum convolutional neural networks (QCNNs): These are specialized neural networks designed for processing data that is encoded in a quantum state. QCNNs can learn complex features from quantum data and perform tasks like classification and regression.

A RNN is used to analyze the sequence of numerical representations and capture long-term dependencies in the data. Output from the model training layer 104 is provided to the code vulnerability detection layer 106.

The code vulnerability detection layer 106 includes a quantum cache and code vulnerability predictor. Utilization of the quantum cache leverages the quantum properties of entanglement and superposition, to store and retrieve quantum states efficiently. The quantum cache enhances the storage and processing capabilities of quantum systems. The code vulnerability detection layer outputs to the trained model 108 to fix and resolve vulnerabilities that are predicted or identified.

This provides an efficient and scalable tampering detection method based on a deep neural network model with LSTM and QLSTM so that learning takes place from the feature extraction from the source code. This system is capable of identifying the code tampering and generating the reports with all the suspicious code tampering areas, which can support manual and automated fixes to those issues in remediation actions. The trained model is capable of analyzing the pattern complexity, input volume and frequency of the request of location type and other parameters. And it will dynamically invoke whichever model is more appropriate in real-time as appropriate.

As an example of a real-time scenario, suppose the code or request the system receives is a large volume of requests and data. And if the complexity of the code work is very high, such as relating to encryption, computationally intense, or large code bases for analysis, that can be detected. The system can then select the QLSTM model, which is better suited for those situations. Conversely, if the code is static, the volume of code is normal, and the code type or pattern is plain or static value, or the majority of the code is structure code, the system will analyze this specific pattern and can use the LSTM model. That will be a classical LSTM model, which is more cost effective.

In that particular pattern, then the system can use a hybrid model like LSTM and QLSTM both, and the system can utilize with the prediction model for identification of tampering. This hybrid LSTM and QLSTM model provides dynamic load balancing of tasks and better performance in effective way of analyzing and detecting the code tampering via LSTM and QLSTM.

Figure 2:
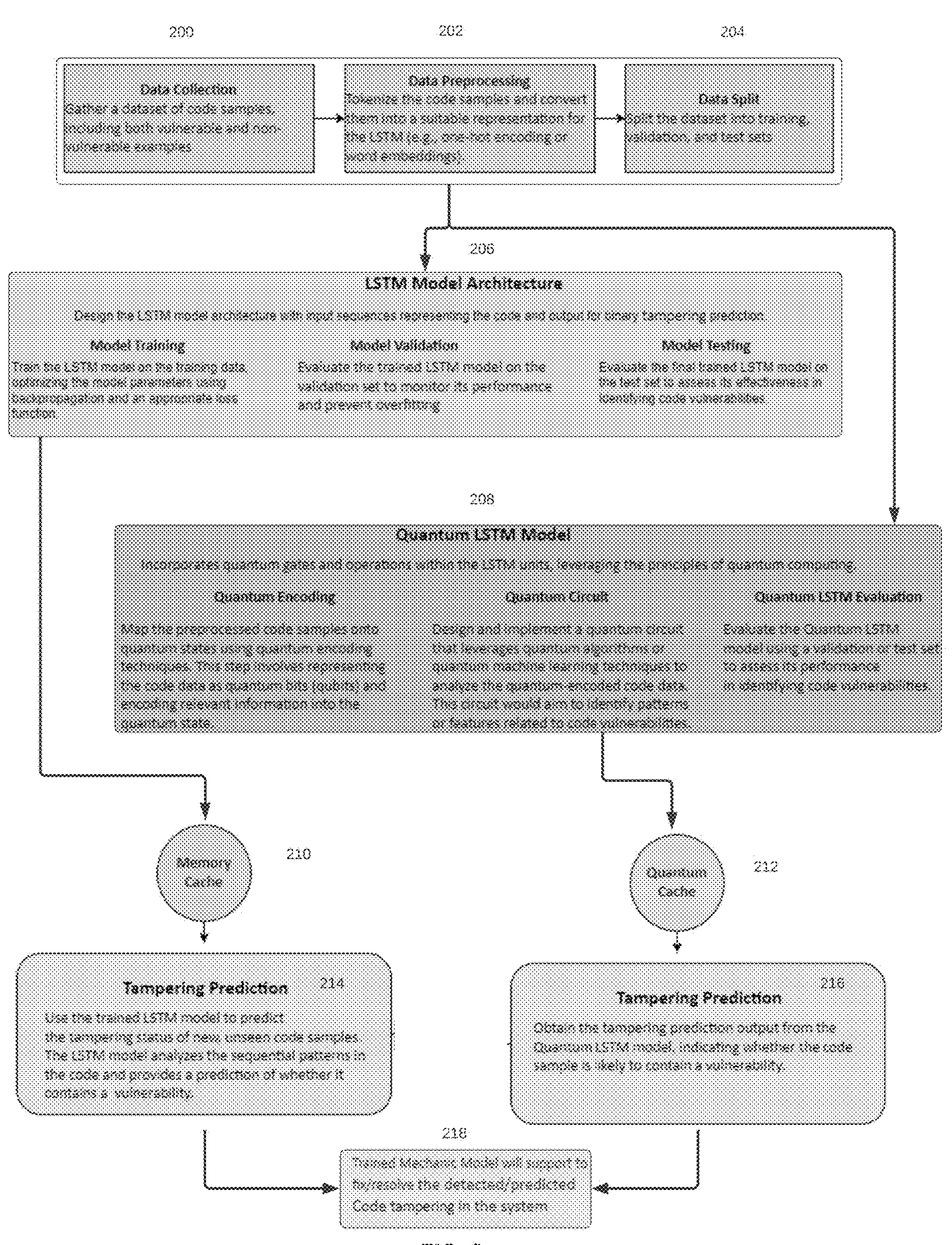
FIG. 2 depicts another functional architecture and flow diagram showing sample interactions, interfaces, steps, functions, and components of a system and process for providing real-time tamper-detection protection for source code using LSTM and QLSTM with quantum cache in accordance with one or more aspects of this disclosure as it pertains to data preprocessing, tokenization, text-to-numerical encoding, quantum feature mapping, LSTM, quantum computing conversion, QLSTM, quantum cache, predicted output and evaluation, post processing, and train models to resolve and fix detected or predicted code vulnerabilities.

By way of non-limiting disclosure, FIG. 2 depicts a further functional architecture and flow diagram showing sample interactions, interfaces, steps, functions, and components of a system and process for providing real-time tamper-detection protection for source code using LSTM and QLSTM with quantum cache in accordance with one or more aspects of this disclosure as it pertains to data collection 200, data preprocessing 202, data split 204, LSTM Model Architecture 206, Quantum LSTM Model Architecture 208, memory cache 210, quantum cache 212, tampering predictions 214 and 216, and issue resolution by trained model 218.

In data collection 200, a dataset of code samples, including both vulnerable code (e.g., code with known security flaws like SQL injection, buffer overflows, etc.) and non-vulnerable code (secure code) are gathered. In data processing 202, code samples are tokenized and converted into suitable representation for the LSTM (e.g., one-hot encoding or word embeddings). Tokenization techniques such as GloVe or FastText are used to convert code snippets into a sequence of tokens (e.g., tokens for keywords, identifiers, literals, and special characters). In data split 204, the dataset is split into training, validation, and test sets.

Output from data collection, data processing, and data split can be provided to the LSTM model 206 and the quantum LSTM (QLSTM) model 208.

For the LSTM model 206, LSTMs can be used to identify code tampering by treating the code as a sequence of tokens or characters. By training an LSTM on a large dataset of code samples, it can learn patterns and dependencies in the code that are indicative of tampering. The LSTM model is designed with input sequences representing the code and output for binary tampering prediction. For model training, the LSTM model is trained on the training data and the model parameters are optimized using backpropagation and an appropriate loss function. Training the LSTM models in RNNs involves adjusting their internal weights to minimize a chosen loss function. This adjustment process is guided by backpropagation through time (BPTT), a specialized version of backpropagation used for RNNs.

BPTT unfolds the LSTM network over time, treating it as a deep feedforward network. It calculates the gradients of the loss function with respect to each weight in the network, starting from the output layer and propagating backward through time. This process considers the internal state of the LSTM cell at each time step, allowing the network to learn long-term dependencies.

Due to the vanishing gradient problem, BPTT can be computationally expensive and prone to exploding gradients for long sequences. Truncated BPTT (TBPTT) addresses this issue by limiting the number of time steps considered when calculating gradients, making training faster and more stable. Either BPTT or TBPTT can be utilized to train the LSTM model.

The loss function measures how well the network's predictions match the desired outputs. Common loss functions used with LSTMs include: mean squared error (MSE) (e.g. for regression tasks); cross-entropy (e.g., for classification tasks); negative log-likelihood (e.g., for sequence modeling tasks), etc. Choosing the appropriate loss function depends on the specific task and desired output.

During training, the LSTM network iterates through the following steps: Forward pass: The input sequence is fed into the network, and the outputs are calculated at each time step. Loss calculation: The loss function is evaluated based on the predicted and desired outputs. BPTT: The gradients of the loss function are calculated and propagated back through the network. Weight update: The network's weights are updated using the gradients and an optimization algorithm like gradient descent. This process is repeated over multiple epochs until the network converges to a desired level of performance.

For model validation, the trained LSTM model is evaluated on the validation set to monitor its performance and prevent overfitting. For model testing, the final trained LSTM model is evaluated on the test set to assess its effectiveness in identifying code vulnerabilities.

The system can convert using a numerical representation based on lines, multiple lines or functions, or individual tokens. According to the model, the LSTM is capable of combining the process with numerical representation. As a result, that will be the first step in the data processing procedure. Data is collected by various systems and converted into a tokenized or numerical representation system. As a result, LSTM can analyze those specific data. When the LSTM process is used, the LSTM state for using with label data where tampered and untampered versions of code or boundaries are provide. The first is a tampered version, and the second is an untampered version that is only used for training. The LSTM is also trained for pattern recognition. Detecting attempts at modification or tampering by analyzing the pattern of the source code or executable boundaries.

If there are any changes to the pattern or boundary files, the process can identify those specific patterns. And, during that particular extraction process, the system will also, during the feature extraction training, plan to train that particular model for detecting code tampering. Patterns may be unique in terms of syntax identification, variable name identification, and code structure changes. In that particular model, the system will be capable of detecting code tampering by providing the code with tampered code as well as untampered code and the training model. The structure of the LSTM model is shown in 208. Following the training, validation, and testing, the system will have a trained LSTM model.

For the QLSTM model 208, quantum computing principles are integrated with LSTM. Thus, quantum gates and operations within the LSTM units are incorporated in order to leverage the principles of quantum computing. In quantum encoding, the preprocessed code samples are mapped onto quantum states using quantum encoding techniques. This step involves representing the code data as quantum bits (qubits) and encoding relevant information into the quantum state. A quantum circuit is used to leverage quantum algorithms or quantum machine learning (ML) techniques to analyze the quantum-encoded code data. The circuit identifies patterns or features related to code vulnerabilities. For quantum LSTM evaluation, the quantum LSTM model is evaluated using a validation or test set to assess its performance in identifying code vulnerabilities.

If the real-time analysis of a particular request is complex, the frequency of the request is very high, the code to be analyzed is unstructured code, or any other condition that would be processive intensive, etc., an analysis can be performed to determine whether it is more efficient to utilize a quantum process instead of classical LSTM.

The LSTM and QLSTM modes respectively provide outputs to memory cache 210 and quantum cache 212. This system increases the efficiency of data access and retrieval. It also acts as an efficient storage of data while executing the machine learning algorithms. Further, the caches speed up the simulation processes.

Memory cache 210 provides its data to tampering prediction 214 for the LSTM model. It uses the trained LSTM model to predict the tampering status of new, unseen code samples. The LSTM model analyzes the sequential patterns in the code and provides a prediction of whether it contains a vulnerability.

Quantum cache 212 provides its data to tampering prediction 216 for the QLSTM model. The tampering prediction output from the QLSTM model is obtained, indicating whether the code sample is likely to contain a vulnerability. The quantum cache leverages quantum computing principles to enable faster data retrieval via access with multiple data points simultaneously, allowing for parallel processing and reducing retrieval time.

The caches 210, 212 provide their output to a trained mechanical model 218 to provide support to fix or resolve the detected or predicted code tampering in the system.

Figure 3:
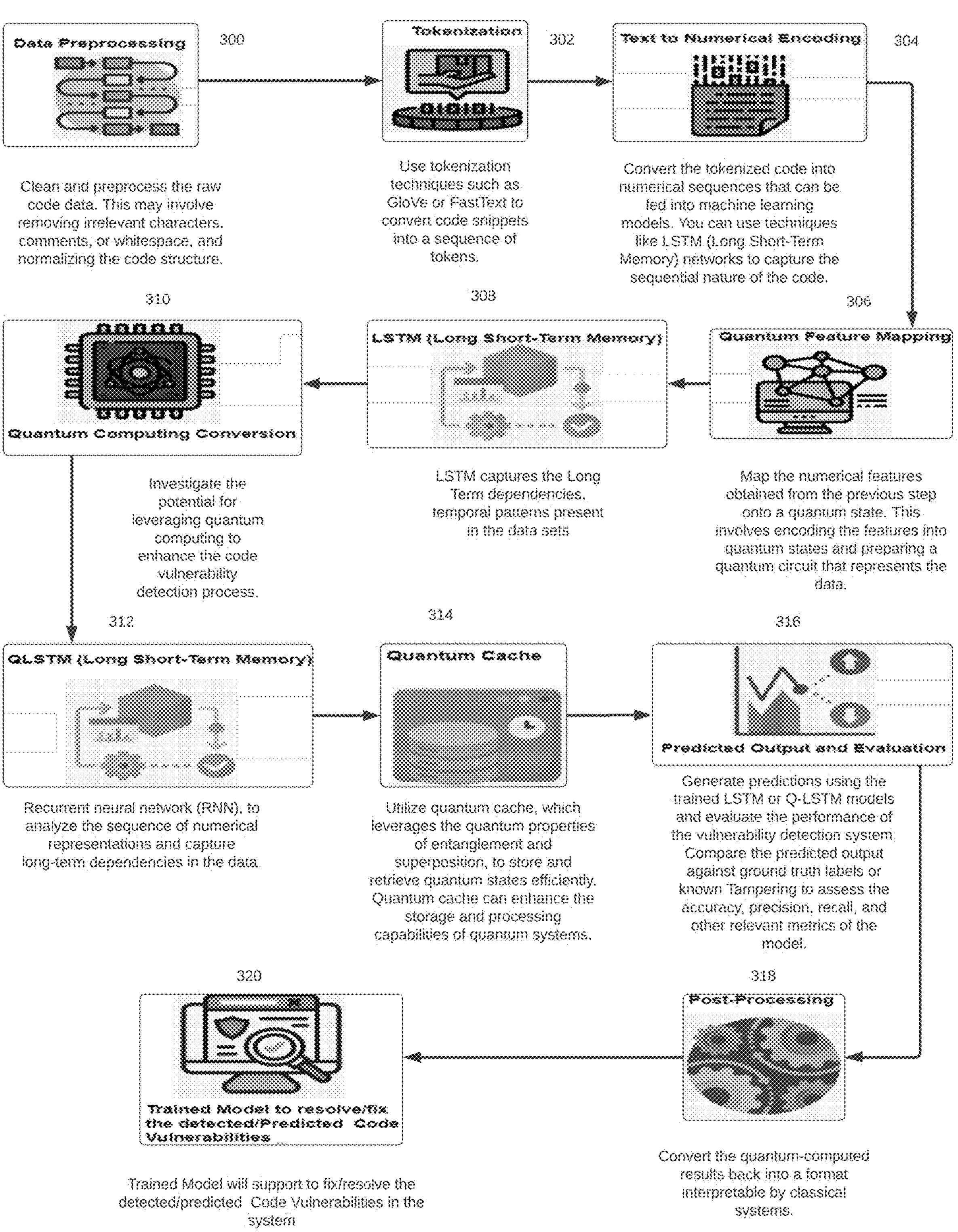
FIG. 3 depicts a further functional architecture and flow diagram showing sample interactions, interfaces, steps, functions, and components of a system and process for providing real-time tamper-detection protection for source code using LSTM and QLSTM with quantum cache in accordance with one or more aspects of this disclosure as it pertains to data collection, data preprocessing, data split, LSTM Model Architecture, Quantum LSTM Model Architecture, memory cache, quantum cache, tampering prediction, and issue resolution by trained model.

By way of non-limiting disclosure, FIG. 3 depicts another functional architecture and flow diagram showing sample interactions, interfaces, steps, functions, and components of a system and process for providing real-time tamper-detection protection for source code using LSTM and QLSTM with quantum cache in accordance with one or more aspects of this disclosure as it pertains to data preprocessing 300, tokenization 302, text-to-numerical encoding 304, quantum feature mapping 306, LSTM 308, quantum computing conversion 310, QLSTM 312, quantum cache 314, predicted output and evaluation 316, post processing 318, and trained models to resolve and fix detected or predicted code vulnerabilities 320.

A thorough cleaning and preprocessing of the raw code data takes place during data preprocessing 300. It is possible that in order to achieve this goal, it will be necessary to remove characters, comments, or whitespace that are not relevant enough. Moreover, the structure of the code will be normalized in the implementation. When raw data is subjected to any kind of manipulation or transformation before it can be used for analysis or machine learning models, this is referred to as "data preprocessing." It entails activities such as data cleaning, which is the process of locating and fixing errors, inconsistencies, and missing values that are present in the existing data. The process of combining data from multiple sources into a single dataset is referred to as data integration. Data transformation refers to the process of scaling, encoding, and normalizing data in order to conform to a particular format called for by the analysis or model. For the purpose of improving computational efficiency, data reduction refers to the process of selecting a subset of relevant features or reducing the dimensionality of the data.

In tokenization 302, tokenization techniques can be used to convert code snippets into a sequence of tokens. It can be accomplished in various ways.

For the purpose of analysis and processing, the purpose of code tokenization is to break down code snippets into meaningful units, which are referred to as tokens. Tokens are typically comprised of elements such as keywords, operators, identifiers, literals, punctuation, and occasionally structural elements (e.g., parentheses, braces).

In order to implement the foregoing, lexical analysis can be used and is a technique that divides code into tokens based on the rules of language grammar. This technique makes use of lexers or regular expressions. Using a tree-based parsing, constructs can utilize an abstract syntax tree (AST) to represent the structure of the code, and tokens can be extracted from the nodes of the AST.

GloVe and FastText are natural language processing (NLP) tools that can also be used for code tokenization. Word embeddings (numerical representations of words) can be learned from large text corpora. Semantic relationships between words can be captured using co-occurrence patterns. Pre-tokenize code can be obtained using language-specific tools, and then GloVe or FastText can be used to learn embeddings for those tokens.

Tree-based tokenization is another option and uses ASTs to obtain more detailed structural and semantic information. Models of code-specific embedding can be used where large code corpora were utilized to train the model to recognize programming-specific relationships between tokens. Hybrid approaches can combine multiple tokenization and embedding techniques in order to obtain best results.

During the process of text-to-numerical encoding 304, the tokenized code is transformed into numerical sequences that can be utilized by machine learning models. In order to capture the sequential nature of the code, it is possible to make use of techniques such as LSTM networks (which stands for long short-term memory).

There is a step called quantum feature mapping 306 that involves mapping the numerical features that were obtained in the previous step onto a quantum state. Both the encoding of the features into quantum states and the preparation of a quantum circuit that represents the data are required for this project.

Quantum Feature Mapping (QFM) is a technique in quantum machine learning that transforms classical data into quantum states, enabling the use of quantum computers for feature extraction and classification tasks. Relevant concepts include: Quantum Feature Space: Instead of representing data as vectors in a classical feature space, QFM maps data to quantum states within a Hilbert space, potentially unlocking more expressive representations. Quantum Circuits: The mapping is typically achieved using parameterized quantum circuits, which act as the feature extractors. These circuits can generate complex patterns and correlations that may be difficult to capture with classical methods. Feature Extraction: The parameters of the quantum circuit are adjusted based on the input data, resulting in a tailored quantum state for each data point. Kernel Methods: QFM is often employed in conjunction with kernel methods, which are machine learning algorithms that operate on similarity measures between data points. The quantum states provide a new way to define kernels, potentially leading to improved performance.

In the LSTM 308, the LSTM is responsible for capturing the temporal patterns and long-term dependencies that are present in the datasets.

The purpose of quantum computing conversion 310 is to investigate the possibility of utilizing quantum computing in order to improve the process of detecting vulnerabilities in code.

A recurrent neural network, also known as an RNN, is utilized in QLSTM 312 for the purpose of analyzing the sequence of numerical representations and identifying long-term dependencies throughout the data.

If desired, a comparative analysis can be performed between the results derived from the classical LSTM model and the quantum LSTM model using the basic features as well as semantic and syntactic features.

The output from the QLSTM is received in quantum cache 314, which is its location. It is possible to make use of the quantum cache in order to take advantage of the quantum properties of entanglement and superposition, to efficiently store and retrieve quantum states, and to improve the quantum system's capacity for storage and processing. QLSTM leverages quantum principles and operations to enhance the analysis and prediction of Tampering, potentially improving the accuracy and effectiveness of the detection process. Quantum cache allows for faster retrieval and manipulation of quantum data, reducing computational overhead and enabling real-time or near-real-time analysis. Quantum cache increases the efficiency of data access and retrieval. It acts as an efficient storage of data while executing the quantum machine learning algorithms. And the cache speeds up the quantum simulation processes.

For the purpose of generating predictions, the trained LSTM or Q-LSTM models are utilized in the predicted output and evaluation module 316 module. An analysis is performed to determine how well the vulnerability detection system is performing. A comparison is made between the predicted output and the ground truth labels or known tampering in order to evaluate the accuracy, precision, recall, and other pertinent metrics of the model.

In the step of the post-processing process, the results of the quantum computation are transformed back into a format that can be understood by classical systems.

In trained model 320, the model provides automated or manual support to fix or resolve the detected or predicted code vulnerabilities in the system.

Various arrangements of the disclosures contained herein focus on real-time code tampering detection. This framework emphasizes real-time or near-real-time code vulnerability detection. By leveraging quantum computing and efficient data processing techniques, the framework enables quick analysis and detection of tampering, allowing for timely remediation and prevention of potential security breaches. The framework's focus on predicting code Tampering based on the QLSTM model's output is a novel application of quantum and deep learning techniques. It utilizes the power of LSTM for sequence analysis and quantum computing for enhanced feature representation and analysis. The framework's ability to process and analyze code written in multiple languages is a novel feature. By incorporating techniques like GloVe and FastText for tokenization and textual encoding, the framework can effectively handle code written in various programming languages, extending its applicability to a wide range of software systems.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for real-time tamper detection in software code and remediation of software code vulnerabilities, comprising the steps of:

retrieving, by a data processing layer, sample datasets of vulnerable code examples and non-vulnerable code examples;

tokenizing, by the data processing layer, the sample datasets into tokenized code examples suitable for long-term short-term memory (LSTM) modeling and quantum long short-term memory (QLSTM) modeling;

splitting, by the data processing layer, the tokenized code examples into a training dataset, a validation dataset, and a test dataset;

transmitting, by the data processing layer to a model training layer, the training dataset, the validation dataset, and the test dataset, said model training layer including an LSTM model and a QLSTM model;

LSTM training, by the model training layer, the LSTM model by:

inputting the training dataset;

executing, by the LSTM model, the training dataset;

calculating actual outputs at each time step during execution;

determining a loss function based on predicted outputs and desired outputs; —calculating gradients for the loss function;

propagating the gradients back into the LSTM model by back propagation through time (BPTT) or truncated back propagation through time (TBPTT);

repeating the LSTM training until the LSTM model converges to a desired level of performance;

validating, by the model training layer, the LSTM model based on the validation dataset to monitor performance of the LSTM model and prevent overfitting;

testing, by the model training layer, the LSTM model based on the test dataset to access effectiveness in identifying tampered code;

QLSTM training, by the model training layer, the QLSTM model by:

mapping the tokenized code examples onto a quantum state using quantum encoding into quantum-encoded code data;

implementing, based on the LSTM model, a quantum circuit to analyze the quantum-encoded code data to identify patterns or features related to said software code vulnerabilities;

evaluating the QLSTM model using the validation dataset and the test dataset;

receiving, by the data processing layer, source code to test for said software code vulnerabilities;

pre-processing, by the data processing layer, the source code to remove non-code characters, remove comments, remove whitespaces, and normalize code structure;

tokenizing, by the data processing layer, the source code to convert code snippets into a sequence of tokens;

encoding, by the data processing layer, the sequence of tokens into numerical sequences that can be analyzed by the LSTM model and the QLSTM model;

executing, by a code vulnerability detection layer, the LSTM model on the numerical sequences if the source code is below a complexity threshold or the source code contains structured code;

executing, by the code vulnerability detection layer, the QLSTM model on the numerical sequences if the source code is above the complexity threshold or the source code contains unstructured code;

storing, by the code vulnerability detection layer, LSTM results from the LSTM model in a memory cache;

storing, by the code vulnerability detection layer, QLSTM results from the QLSTM model in a quantum cache;

predicting, by the code vulnerability detection layer using the memory cache or the quantum cache, tampered code in the source code;

detecting, by the code vulnerability detection layer using the memory cache or the quantum cache, potential vulnerabilities in the source code; and remediating, automatically by a remediation module, the tampered code or the potential vulnerabilities in the source code.

2. The method of claim 1 further comprising the step of dynamically switching between the LSTM model and the QLSTM model based on real-time analysis code complexity, code volume, and whether the source code contains said structured code or said unstructured code.

3. The method of claim 2 further comprising the step of dynamically switching between the LSTM model and the QLSTM model based on a frequency of tamper detection analysis requests.

4. The method of claim 3 further comprising the step of generating, by the code vulnerability detection layer, a report that identifies each area of the source code that contains tampered code or the potential vulnerabilities.

5. The method of claim 4 further comprising the step of converting, by the QLSTM model the QLSTM results from a quantum format into a classical format that can be read by a non-quantum computing system.

6. The method of claim 5 wherein the gradients are propagated back into the LSTM model by TBPTT.

7. The method of claim 6 wherein the mapping of the tokenized code examples uses quantum embedding techniques to represent the tokenized code examples in the quantum state, said quantum embedding techniques including: amplitude encoding, phase encoding, quantum feature maps, or quantum convolutional neural networks.

8. The method of claim 7 wherein the quantum embedding techniques are said quantum feature maps.

9. The method of claim 5 wherein the gradients are propagated back into the LSTM model by BPTT.

10. The method of claim 9 wherein the loss function is mean squared error (MSE), cross-entropy, or negative log-likelihood.

11. The method of claim 10 wherein the mapping of the tokenized code examples uses quantum embedding techniques to represent the tokenized code examples in the quantum state, said quantum embedding techniques including: amplitude encoding, phase encoding, quantum feature maps, or quantum convolutional neural networks.

12. The method of claim 11 wherein the quantum embedding techniques are said quantum feature maps.

13. The method of claim 12 wherein the loss function is mean squared error (MSE), cross-entropy, or negative log-likelihood.

14. A method for real-time tamper detection in software code and remediation of software code vulnerabilities, comprising the steps of:

retrieving, by a data processing layer, sample datasets of vulnerable code examples and non-vulnerable code examples;

tokenizing, by the data processing layer, the sample datasets into tokenized code examples suitable for long-term short-term memory (LSTM) modeling and quantum long short-term memory (QLSTM) modeling;

splitting, by the data processing layer, the tokenized code examples into a training dataset, a validation dataset, and a test dataset;

transmitting, by the data processing layer to a model training layer, the training dataset, the validation dataset, and the test dataset, said model training layer including an LSTM model and a QLSTM model;

LSTM training, by the model training layer, the LSTM model by:

inputting the training dataset;

executing, by the LSTM model, the training dataset;

calculating actual outputs at each time step during execution;

determining, based on predicted outputs and desired outputs, a loss function of mean squared error (MSE), cross-entropy, or negative log-likelihood;

calculating gradients for the loss function;

propagating the gradients back into the LSTM model by back propagation through time (BPTT);

repeating the LSTM training until the LSTM model converges to a desired level of performance;

validating, by the model training layer, the LSTM model based on the validation dataset to monitor performance of the LSTM model and prevent overfitting;

testing, by the model training layer, the LSTM model based on the test dataset to access effectiveness in identifying tampered code;

QLSTM training, by the model training layer, the QLSTM model by:

mapping the tokenized code examples onto a quantum state using quantum encoding into quantum-encoded code data based on quantum feature mapping;

implementing, based on the LSTM model, a quantum circuit to analyze the quantum-encoded code data to identify patterns or features related to said software code vulnerabilities;

evaluating the QLSTM model using the validation dataset and the test dataset;

receiving, by the data processing layer, source code to test for said software code vulnerabilities;

pre-processing, by the data processing layer, the source code to remove non-code characters, remove comments, remove whitespaces, and normalize code structure;

tokenizing, by the data processing layer, the source code to convert code snippets into a sequence of tokens;

encoding, by the data processing layer, the sequence of tokens into numerical sequences that can be analyzed by the LSTM model and the QLSTM model;

executing, by a code vulnerability detection layer, the LSTM model on the numerical sequences if the source code is below a complexity threshold or the source code contains structured code;

executing, by the code vulnerability detection layer, the QLSTM model on the numerical sequences if the source code is above the complexity threshold or the source code contains unstructured code;

dynamically switching between the LSTM model and the QLSTM model based on real-time analysis code complexity, code volume, whether the source code contains said structured code or said unstructured code, and a frequency of tamper detection analysis requests;

storing, by the code vulnerability detection layer, LSTM results from the LSTM model in a memory cache;

storing, by the code vulnerability detection layer, QLSTM results from the QLSTM model in a quantum cache;

predicting, by the code vulnerability detection layer using the memory cache or the quantum cache, tampered code in the source code;

detecting, by the code vulnerability detection layer using the memory cache or the quantum cache, potential vulnerabilities in the source code; and remediating the tampered code or the potential vulnerabilities in the source code.

15. The method of claim 14 wherein the remediating is performed automatically.

16. A system for real-time tamper detection in software code and remediation of vulnerabilities, comprising:

a memory storing source code;

a data processing layer configured to process and tokenize the source code into tokenized code, said source code having a complexity and volume as well as containing structured code or unstructured code, said data processing layer including:

a data collection processor configured to provide a dataset of vulnerable code examples and non-vulnerable examples, a data preprocessing processor configured to tokenize the vulnerable code examples and the non-vulnerable examples, and a data split processor configured to split the dataset into training data, validation data, and test set data;

a model training layer configured receive the tokenized code from the data processing layer and to train:

a long short-term memory (LSTM) model for analyzing said source code if the complexity is below a complexity threshold, the volume is below a volume threshold, and the source code contains said structured code;

a quantum long short-term memory (QLSTM) model for analyzing said source code if the complexity is above a complexity threshold, the volume is above a volume threshold, or the source code contains said unstructured code;

a code vulnerability detection layer configured to use:

the LSTM model to analyze the tokenized code for said vulnerabilities; and the QLSTM model to analyze the tokenized code for said vulnerabilities;

a quantum cache configured to store and retrieve quantum states from the QLSTM; and a trained model configured to resolve detected threats.

17. The system of claim 16, wherein the model training layer is further configured to use quantum embedding techniques to represent the tokenized code in a quantum state.

18. The system of claim 17, wherein the quantum embedding techniques include amplitude encoding, phase encoding, quantum feature maps, or quantum convolutional neural networks.

19. The system of claim 18, wherein the quantum embedding techniques are said quantum feature maps.

20. The system of claim 19, wherein the trained model is further configured to generate reports with all suspicious code tampering areas, which can support manual and automated fixes to those issues in remediation actions.

* * * * *